United States Patent
Schmidt

(10) Patent No.: US 9,878,780 B2
(45) Date of Patent: Jan. 30, 2018

(54) AIRCRAFT LANDING GEAR ASSEMBLY

(71) Applicant: Safran Landing Systems UK Ltd., Gloucester, Gloucestershire (GB)

(72) Inventor: Robert Kyle Schmidt, Gloucester (GB)

(73) Assignee: Safran Landing Systems UK LTD, Gloucestershire (GB)

( * ) Notice: Subject to any disclaimer, the term of this patent is extended or adjusted under 35 U.S.C. 154(b) by 133 days.

(21) Appl. No.: 15/072,974

(22) Filed: Mar. 17, 2016

(65) Prior Publication Data
US 2016/0272303 A1 Sep. 22, 2016

(30) Foreign Application Priority Data
Mar. 20, 2015 (EP) .................. 15160002

(51) Int. Cl.
*B64C 25/20* (2006.01)
*B64C 25/26* (2006.01)
*B64C 25/34* (2006.01)
*B64C 25/58* (2006.01)

(52) U.S. Cl.
CPC .............. *B64C 25/20* (2013.01); *B64C 25/26* (2013.01); *B64C 25/34* (2013.01); *B64C 25/58* (2013.01)

(58) Field of Classification Search
CPC ....... B64C 25/001; B64C 25/20; B64C 25/14; B64C 25/26; B64C 25/58; B64C 25/10
See application file for complete search history.

(56) References Cited

U.S. PATENT DOCUMENTS

| | | | | |
|---|---|---|---|---|
| 2,326,210 A * | 8/1943 | Falk | ........................ | B64C 25/02 244/104 R |
| 2,621,004 A * | 12/1952 | Ashton | .................... | B64C 25/12 244/102 R |
| 3,826,450 A * | 7/1974 | Currey | .................. | B64C 25/001 244/100 R |
| 4,063,698 A * | 12/1977 | Masclet | .................. | B64C 25/10 244/102 R |
| 9,440,732 B2 * | 9/2016 | Toon | ........................ | B64C 25/20 |
| 2009/0176078 A1 * | 7/2009 | Seror | .................... | B64C 25/001 428/218 |
| 2010/0017052 A1 * | 1/2010 | Luce | ........................ | B64C 25/60 701/16 |
| 2012/0037752 A1 * | 2/2012 | Collins | .................... | B64C 25/26 244/102 SL |
| 2015/0203192 A1 * | 7/2015 | Slanker | .................... | B64C 25/12 244/102 R |
| 2016/0347444 A1 * | 12/2016 | Vatovec | .................... | B64C 25/20 |
| 2017/0203833 A1 * | 7/2017 | Schmidt | .................. | B64C 25/10 |

FOREIGN PATENT DOCUMENTS

| | | |
|---|---|---|
| GB | 2495999 | 5/2013 |
| GB | 2507823 | 5/2014 |

OTHER PUBLICATIONS

Extended European Search Report for EP Application No. 15160002.0, dated Oct. 13, 2015, 7 pages. 2015.

* cited by examiner

*Primary Examiner* — Justin M Benedik
(74) *Attorney, Agent, or Firm* — RatnerPrestia

(57) ABSTRACT

An aircraft landing gear assembly includes a bi-stable, split line tube biased to assume a tubular condition to serve in place of a lock link or side stay and an actuator configured to radially enlarge the tube at a region for folding.

19 Claims, 2 Drawing Sheets

AIRCRAFT LANDING GEAR ASSEMBLY

This Application claims the benefit of and priority to European Application 15160002.0, filed Mar. 20, 2015, which is incorporated herein by reference.

BACKGROUND TO THE INVENTION

An aircraft landing gear assembly is generally movable between a deployed condition, for take-off and landing, and a stowed condition for flight.

An actuator is provided for moving the landing gear between the deployed condition and the stowed condition. This actuator is known in the art as a retraction actuator, and more than one can be provided. A retraction actuator may have one end coupled to the airframe and another end coupled to the main strut such that extension and retraction of the actuator results in movement of the main strut between deployed and stowed conditions.

A brace or stay is generally provided to support the orientation of the main fitting when the landing gear is in the deployed condition. A stay generally includes a two bar linkage that can be unfolded to assume a generally aligned, over centre condition in which the stay is locked to inhibit movement of the main fitting. When the stay is broken, it no longer reacts movement of the main fitting and the main fitting can be moved by the retraction actuator to the stowed condition. Some main landing gear assemblies include a pair of stays coupled to a common main fitting.

A lock link is generally provided in conjunction with each stay to maintain the stay in the locked condition. A lock link generally includes a two bar linkage that can be unfolded to assume a locked over centre condition to inhibit movement of the stay. The lock link must be broken to enable the stay to be folded, thereby permitting the main fitting to be moved by the retraction actuator towards the stowed condition.

It is common for a landing gear assembly to be arranged to move towards the deployed condition in the event of a failure of the retraction actuator. Initially, the landing gear assembly will move by way of gravity, and in doing so the stay is forced to move towards the locked condition. One or more down lock springs are generally provided to assist in moving the landing gear assembly to the deployed condition and locking it in that state by making the lock link. Down lock springs also inhibit the lock link accidentally being unlocked.

A down lock spring is generally a titanium alloy coil spring, which can be coupled between the lock link and another part of the landing gear assembly, such as an arm of the stay assembly.

The present inventor has identified that known landing gear assemblies are susceptible to bird strike and impacts from tyre debris. In addition, certain components can experience early fatigue rupture due to vibratory loading, imparted either from the landing gear operation, aerodynamic affects, or airframe vibrations.

SUMMARY OF INVENTION

According to a first aspect of the invention there is provided an aircraft landing gear assembly comprising:

a main shock absorbing strut arranged to be movably coupled to an aircraft so as to be movable between a deployed condition, for take-off and landing, and a stowed condition for flight;

a support linkage coupled at a first anchor point to the main shock absorbing strut and having a second anchor point arranged to be coupled to the aircraft, the support linkage having a locked condition in which it is arranged to inhibit movement of the main shock absorbing strut from the deployed condition in one or more planes of movement and an unlocked condition in which it permits the main shock absorbing strut to move from the deployed condition to the retracted condition, characterised in that:

the support linkage comprises a split tube spring having a longitudinal slot, the spring being biased to assume a tubular condition in which it can react axial loading thereof, and an actuator operable to radially enlarge a region of the tube for the tube to fold at the enlarged region, the support linkage being in the locked condition when the tube is in the tubular condition and being in the unlocked condition when the tube is folded.

Thus, the landing gear assembly according to aspects of the invention includes a tubular spring having a longitudinal slot, such as a bi-stable split line tube, which can replace a conventional lock link to lock a stay in its aligned condition, or can replace the stay and lock link to directly maintain the strut in the deployed condition. The split tube spring is a simple, elegant replacement for folding lock links and stays, which introduce a significant number of pin joints, requiring lubrication, maintenance, and which in comparison to the split tube spring increase the weight and complexity of the landing gear assembly. The landing gear according to the first aspect can also have fewer individual pieces, reducing associated wear effects thereby increasing reliability and reducing maintenance.

The split tube spring can be elongate.

The split tube spring can be a bi-stable tube.

The longitudinal slot can extend along the full length of the split tube spring.

The split tube spring can be formed from metal or a fibre composite material.

The ends of the split tube spring can be coupled to components of the landing gear assembly by fittings which hold the ends of the tube in the tubular condition.

The end fittings of the tube spring can be rigid. In some embodiments the end fittings can each be longer than the split tube spring, such that the spring defines a flexible elbow region in an otherwise rigid linkage, which can be advantageous when the spring is formed from a fibre composite material; in such embodiments the fittings and spring can be integrally formed, with the fibre layup in the fittings being arranged to define rigid portions and the layup in the spring portion be arranged to define a split tube spring having a longitudinal slot, the spring being biased to assume a tubular condition and being foldable, such as a bi-stable spring. The tube spring can therefore be a rigid tube having a central portion which is short in comparison to the length of the tube, the central portion including a longitudinal slot and having bi-stable properties. Alternatively, the fittings can each be shorter than the spring, which can be advantageous if the spring is formed from metal; the fittings can each be less than ⅒ of the length of the spring such that the spring defines most of the linkage.

The support linkage can include a folding stay arm which defines the first and second anchor points, a first end of the split tube spring being coupled to the stay and a second end of the split tube spring being coupled to another part of the landing gear assembly, such as the main fitting of the main shock absorbing strut. In such embodiments, the end fittings of the split tube spring can be pivotally coupled to the specified parts of the landing gear assembly.

Alternatively, the end fittings of the split tube spring can define the first and second anchor points such that the split tube spring directly replaces the stay of a conventional landing gear assembly. In such embodiments the end fittings, which define the anchor points, can be rigidly coupled respectively to main strut and airframe.

The split tube spring can be held within the end fittings such that split line of the split tube spring is can be orientated towards the main strut or the aircraft such that the split tube spring will fold during retraction of the gear into the assembly.

The landing gear assembly can include a second split tube spring having a longitudinal slot, the spring being coupled at a third anchor point to the main shock absorbing strut and having a fourth anchor point arranged to be coupled to the aircraft, the split tube spring having a tubular condition in which it is arranged to inhibit movement of the main shock absorbing strut from the deployed condition in a plane of movement and an unlocked, folded condition in which it permits the main shock absorbing strut to move from the deployed condition to the retracted condition, the landing gear assembly further including a second actuator operable to radially enlarge a region of the second tube for the second tube to fold at the enlarged region.

In such embodiment, the first and second split tube springs can be held within their end fittings such that their split lines are orientated away from one another when the tubes are in the tubular conditions, such that the tubes do not contact one another during retraction of the landing gear.

According to a second aspect of the invention, there is provided an aircraft landing gear assembly including a split tube spring having a longitudinal slot, the spring being coupled to a foldable stay arm and being biased to assume a tubular condition in which it can react axial loading thereof, and an actuator operable to radially enlarge a region of the tube for the tube to fold at the enlarged region, wherein, the split tube spring is configured to lock the stay arm in a generally aligned condition when it is in the tubular condition and is configured to permit folding of the stay arm when it is folded.

According to a third aspect of the invention, there is provided an aircraft landing gear assembly including a split tube spring having a longitudinal slot, the spring being coupled at a first anchor point to the landing gear assembly and having a second anchor point arranged to be coupled to the aircraft, the split tube spring being biased to assume a tubular condition in which it can react axial loading thereof, and an actuator operable to radially enlarge a region of the tube for the tube to fold at the enlarged region, wherein the split tube spring is configured in the tubular condition inhibit movement of the landing gear assembly from a deployed condition to retracted condition and configured permit such movement when folded.

Optional features of the assembly according to the first aspect can be applied to the assemblies of the second and third aspects in an analogous fashion.

According to a fourth aspect of the invention, there is provided an aircraft including one or more landing gear according to earlier aspects of the invention.

BRIEF DESCRIPTION OF THE DRAWINGS

Embodiments of the invention will now be described, strictly by way of example only, with reference to the accompanying drawings, of which.

DESCRIPTION OF THE EMBODIMENTS

As an overview, embodiments of the invention relate to an aircraft landing gear assembly which includes a tubular spring having a longitudinal slot which is biased to assume a tubular condition to serve in place of a lock link or side stay and an actuator configured to radially enlarge the tube at a region for folding.

Figure 1:
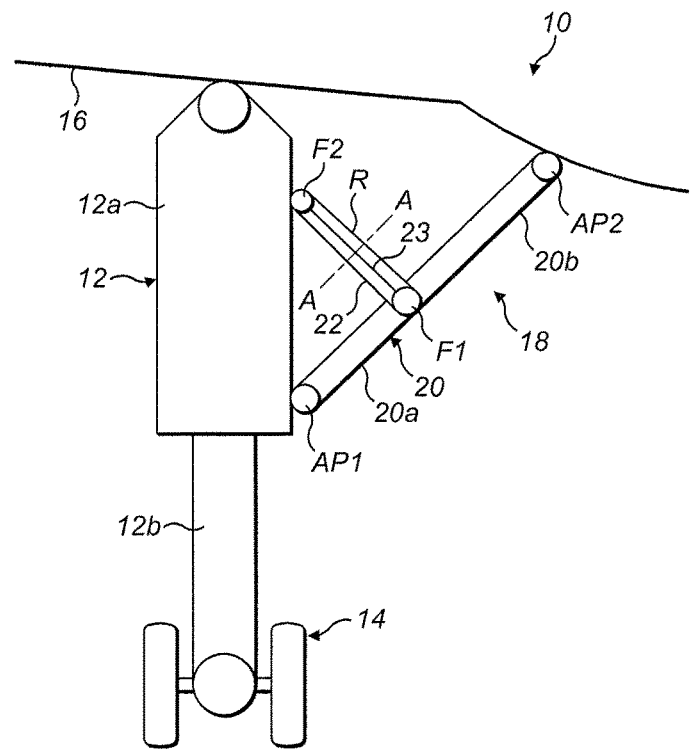
FIG. 1 is a schematic representation of a landing gear assembly according to an embodiment of the invention.

Referring first to FIG. 1, part of an aircraft, namely an aircraft landing gear assembly is shown generally at 10.

The landing gear assembly 2 includes a main shock absorbing strut 12 having a main fitting 12a arranged to be movably coupled to an aircraft 16 and a telescoping slider 12b slidably coupled to the main fitting 12a and having a lower free end which carries any suitable wheel assembly 14. The main strut 12 is movable by a retraction actuator (not shown) between a deployed condition, for take-off and landing, and a stowed condition for flight.

A support linkage 18 is coupled at a first anchor point AP1 to the main shock absorbing strut 12 and has a second anchor point AP2 arranged to be coupled to the aircraft 16. The support linkage 18 includes a conventional folding stay 20 consisting of a pair of hinged arms 20a, 20b the free ends of which define the first and second anchor points AP1, AP2. The support linkage 18 has a locked condition in which it is arranged to inhibit movement of the main shock absorbing strut 12 from the illustrated deployed condition in the plane of movement of the page, and an unlocked condition in which stay arm 20 folds to permits the main shock absorbing strut 12 to move from the deployed condition to the retracted condition.

Figure 2A:
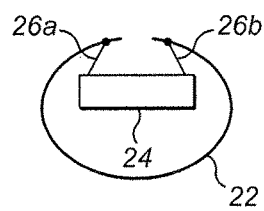
FIGS. 2a to 2c are schematic representations of the split tube spring through section A-A in a tubular condition, a radially enlarged condition and a flat condition respectively.
Figure 2B:
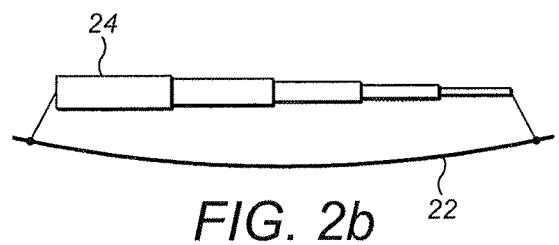
Figure 2C:
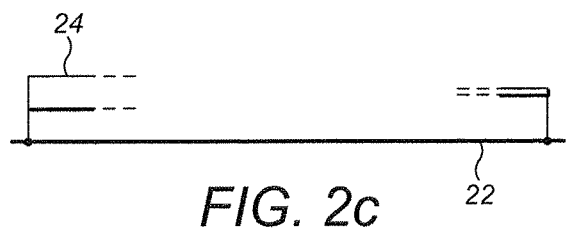

Referring additionally to FIGS. 2a to 2c, the support linkage 18 also includes a bi-stable split line tube 22 biased to assume a tubular condition, as illustrated in FIG. 2a through section A-A of FIG. 1, in which the tube can react axial loading thereof. As will be appreciated by the skilled person, a bi-stable tube is a length of flexible material which can adopt a stable extended or tubular shape, as shown in FIG. 2a, in addition to a stable coiled state in which the section through A-A of FIG. 1 is substantially flat as shown in FIG. 2c. Bi-stable tubes can be formed from various materials such as metal or fibre composite.

A first end of the split tube spring 22 defines a fitting F1 coupled to the stay 20. A second end of the split tube spring 22 defines a second fitting F2 coupled to another part of the landing gear assembly 10, such as the main fitting 12a of the main shock absorbing strut 12. The end fittings F1, F2 of the split tube spring 22 are pivotally coupled to the specified parts of the landing gear assembly to allow the fittings F1, F2 to pivot about axes which are orthogonal to the plane of the page and the longitudinal axis of the tube 22.

When in the tubular condition, the split tube spring 22 serves to lock the stay arm 20 in the aligned condition in which it is arranged to inhibit movement of the main shock absorbing strut 12 from the illustrated deployed condition. Thus, the support linkage 18 is the locked condition when the tube 22 is in the tubular condition.

As the split tube spring 22 will fold preferentially wherever it is flattened, unlocking facility is provided by a 'flattening actuator' provided at the preferred folding location. The actuator is actuated when retraction of the landing gear assembly 10 is commanded. In the illustrated embodiment, a hydraulic actuator 24 is coupled to the edges of the tube 22 around midway along the tube 24 via pivotal couplings 26a, 26b. The actuator 24 is operable to radially enlarge a region R of the tube 22 for the tube 22 to fold at the enlarged region R. As illustrated in FIG. 2b, the actuator has extended to unwind the coil such that the tube 22 is almost flat. As illustrated in FIG. 2c, the actuator 24 is fully extended and the tube 22 is flat, ready to be folded. The folding can be effected by the stay arm 22 attempting to move out of the aligned condition and thereafter by the retraction actuator. Thus, the support linkage 18 is the unlocked condition when the tube is folded.

In other embodiments, the actuator 24 can take any suitable form configured to radially enlarge a region R of the tube 22 for the tube 22 to fold at the enlarged region R; for example, the actuator 24 can take the form of an inflatable bladder, a mechanical system for pulling the edges of the tube apart, or a system employing a shape memory alloy to locally extend and snap the tube to its other stable form. Where a mechanical unlocking mechanism is provided, it can include a spring to return to the 'non-interfering' position where the split tube spring may assume the tubular form.

Advantageously, the landing gear assembly 10 of the illustrated embodiment requires no additional lock link, as the split tube spring 22 performs this function when in the tubular condition, and moreover there is no requirement for a down lock spring because the split tube spring 22 itself provides the energy to move towards and 'lock' into the tubular condition.

Figure 3:
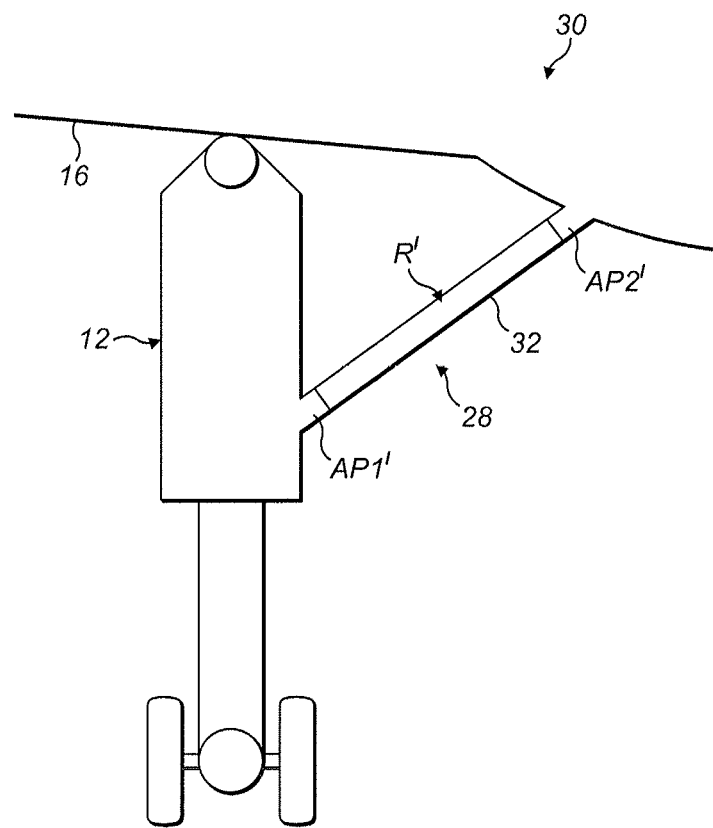
FIG. 3 is a schematic representation of a landing gear assembly according to a further embodiment of the invention.

Referring now to FIG. 3, an aircraft landing gear assembly according to a further embodiment of the invention is shown generally at 30. The landing gear assembly 30 is similar to that 10 of the FIG. 1, and for brevity the following description will focus on the differences.

In the illustrated embodiment, the end fittings of the split tube spring 32 define the first and second anchor points AP 1', AP2' such that the split tube spring 32 directly replaces the stay of a conventional landing gear assembly. The end fittings are rigidly coupled respectively to main strut 12 and airframe 16. A flattening actuator (not shown) such as those described above can be provided for radially enlarging a region R' of the tube 32 such that it can fold at the flattened region.

As will be appreciated, it is common in use for a main landing gear stay to experience loads which are a function of the size of the aircraft and the geometry of the side stay. Side loads at the ground may be on the order of half the vertical load, which could for example be roughly half the weight of the aircraft. Knowing the position of the attachment and the angle of attachment, it is possible calculate the load in the stay. The skilled person will be capable of using routine compression testing methods to ascertain whether a particular split tube spring is suitable for use in place of a conventional stay arm.

Figure 4:
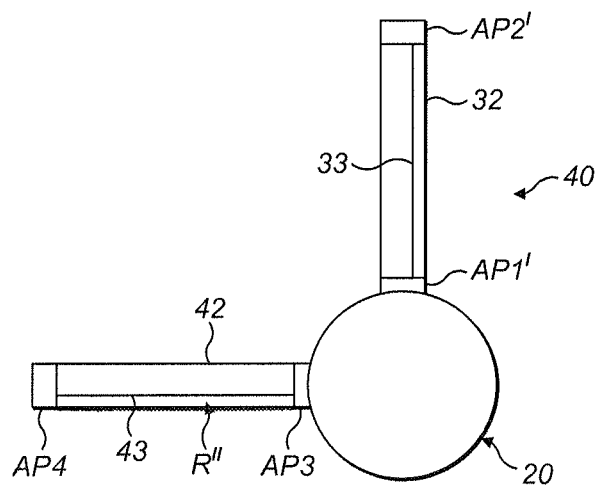
FIG. 4 is a schematic plan view of a landing gear assembly according to a further embodiment of the invention.

In any embodiment, the split tube spring 22, 32 can be held within its end fittings such that split line i.e. the gap between longitudinal edges of the tube, is can be orientated towards the main strut 12 or the aircraft 16 such that the split tube spring 22, 32 will fold during retraction of the gear in a desired direction. This is advantageous when meeting the stowage requirements for a given aircraft Referring now to FIG. 4, an aircraft landing gear assembly according to a further embodiment of the invention is shown generally at 40. The landing gear assembly 40 is similar to that 30 of the FIG. 3, and for brevity the following description will focus on the differences.

The landing gear assembly 40 includes a second bi-stable split line tube 42 coupled at a third anchor point AP3 to the main shock absorbing strut 12 and having a fourth anchor point AP4 arranged to be coupled to the aircraft. The split tube spring 42 has a tubular, locked condition in which it is arranged to inhibit movement of the main shock absorbing strut 12 from the deployed condition in a plane of movement and an unlocked, folded condition in which it permits the main shock absorbing strut 12 to move from the deployed condition to the retracted condition. The landing gear assembly further includes a second actuator (not shown) operable to radially enlarge a region R" of the second tube 42 for the second tube 42 to fold at the enlarged region R. Thus, the landing gear assembly 40 can include a dual tube arrangement akin to a dual stay arrangement in which, for example, a forward and aft stay can be provided to reduce loading on the aircraft wing.

In such embodiments, the first and second split tube springs 32, 42 can be held within their end fittings such that their split lines 33, 43 are orientated away from one another when the tubes are in the tubular conditions, such that the tubes 32, 42 do not contact one another during retraction of the landing gear assembly 40.

Although in the described embodiments the tube is defined by a bi-stable split line tube, in other embodiments any tubular spring having a longitudinal slot can be used.

The split tube spring according to embodiments of the invention can be formed from any suitable spring material which is biased to assume a tubular or coiled condition in which it can react axial loading thereof, and can be unfolded or radially enlarged to permit the spring to fold; for example, the tube spring can be formed from metal or a fibre composite material.

In any embodiment the end fittings of the tube spring can be rigid. In some embodiments the end fittings can each be longer than the split tube spring, such that the spring defines a flexible elbow region in an otherwise rigid linkage, which can be advantageous when the spring is formed from a fibre composite material; in such embodiments the fittings and spring can be integrally formed, with the fibre layup in the fittings being arranged to define rigid portions and the layup in the spring portion be arranged to define a split tube spring having a longitudinal slot, the spring being biased to assume a tubular condition and being foldable, such as a bi-stable spring. Alternatively, the fittings can each be shorter than the spring, which can be advantageous if the spring is formed from metal; the fittings can each be less than 1/10 of the length of the spring such that the spring defines most of the linkage.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft landing gear assembly comprising:
   a main shock absorbing strut arranged to be movably coupled to an aircraft so as to movable between a deployed condition, for take-off and landing, and a stowed condition for flight;
   a support linkage coupled at a first anchor point to the main shock absorbing strut and having a second anchor point arranged to be coupled to the aircraft, the support linkage having a locked condition in which it is arranged to inhibit movement of the main shock absorbing strut from the deployed condition in one or more planes of movement and an unlocked condition in which it permits the main shock absorbing strut to move from the deployed condition to the retracted condition,
   the support linkage comprising a split tube spring having a longitudinal slot the spring being biased to assume a tubular condition in which it can react axial loading thereof, and an actuator operable to radially enlarge a region of the tube for the tube to fold at the enlarged region, the support linkage being in the locked condition when the tube is in the tubular condition and being in the unlocked condition when the tube is folded.

2. The aircraft landing gear assembly according to claim 1, wherein the ends of the split tube spring are coupled to components of the landing gear assembly by fittings which hold the ends of the tube in the tubular condition.

3. The aircraft landing gear assembly according to claim 2, wherein the end fittings of the tube spring are rigid.

4. The aircraft landing gear assembly according to claim 3, wherein the end fittings are longer than the length of the split tube spring when in the tubular condition, such that the spring defines a relatively short flexible elbow region between the rigid fittings.

5. The aircraft landing gear assembly according to claim 3, wherein the end fittings are shorter than the length of the split tube spring when in the tubular condition.

6. The aircraft landing gear assembly according to claim 1, wherein the support linkage includes a folding stay arm which defines the first and second anchor points, a first end of the split tube spring being coupled to the stay and a second end of the split tube spring being coupled to another part of the landing gear assembly.

7. The aircraft landing gear assembly according to claim 6, wherein the end fittings of the split tube spring are pivotally coupled to the specified parts of the landing gear assembly.

8. The aircraft landing gear assembly according to claim 1, wherein the end fittings of the split tube spring define the first and second anchor points.

9. The aircraft landing gear assembly according to claim 8, wherein the end fittings are rigidly coupled to main strut and airframe respectively.

10. The aircraft landing gear assembly according to claim 8, further comprising a second bi-stable split line tube coupled at a third anchor point to the main shock absorbing strut and having a fourth anchor point arranged to be coupled to the aircraft, the split tube spring having a tubular, locked condition in which it is arranged to inhibit movement of the main shock absorbing strut from the deployed condition in a plane of movement and an unlocked, folded condition in which it permits the main shock absorbing strut to move from the deployed condition to the retracted condition, the landing gear assembly further including a second actuator operable to radially enlarge a region of the second tube for the second tube to fold at the enlarged region.

11. The aircraft landing gear assembly according to claim 10, wherein the first and second split tube springs are held within their end fittings such that their split lines are orientated away from one another when the tubes are in the tubular conditions.

12. The aircraft landing gear assembly according to claim 11, wherein each split tube spring is held within its end fittings such that split line of the split tube spring is can be orientated towards the main strut or the aircraft.

13. An aircraft landing gear assembly according to claim 1, wherein the split tube spring is held within its end fittings such that split line of the split tube spring is can be orientated towards the main strut or the aircraft.

14. An aircraft landing gear assembly according to claim 1, wherein the split tube spring is formed from metal or a fibre composite material.

15. An aircraft landing gear assembly including a split tube spring having a longitudinal slot, the spring being coupled to a foldable stay arm and being biased to assume a tubular condition in which it can react axial loading thereof, and an actuator operable to radially enlarge a region of the tube for the tube to fold at the enlarged region, wherein, the split tube spring is configured to lock the stay arm in a generally aligned condition when it is in the tubular condition and is configured to permit folding of the stay arm when it is folded.

16. An aircraft landing gear assembly according to claim 15, wherein the split tube spring is formed from metal or a fibre composite material.

17. An aircraft landing gear assembly including a split tube spring having a longitudinal slot, the spring being coupled at a first anchor point to the landing gear assembly and having a second anchor point arranged to be coupled to the aircraft, the split tube spring being biased to assume a tubular condition in which it can react axial loading thereof, and an actuator operable to radially enlarge a region of the tube for the tube to fold at the enlarged region, wherein the split tube spring is configured in the tubular condition inhibit movement of the landing gear assembly from a deployed condition to retracted condition and configured permit such movement when folded.

18. An aircraft landing gear assembly according to claim 17, wherein the split tube spring is formed from metal or a fibre composite material.

19. An aircraft including one or more aircraft landing gear assemblies each comprising:
   a main shock absorbing strut arranged to be movably coupled to an aircraft so as to movable between a deployed condition, for take-off and landing, and a stowed condition for flight;
   a support linkage coupled at a first anchor point to the main shock absorbing strut and having a second anchor point arranged to be coupled to the aircraft, the support linkage having a locked condition in which it is arranged to inhibit movement of the main shock absorbing strut from the deployed condition in one or more planes of movement and an unlocked condition in which it permits the main shock absorbing strut to move from the deployed condition to the retracted condition,
   the support linkage comprising a split tube spring having a longitudinal slot the spring being biased to assume a tubular condition in which it can react axial loading thereof, and an actuator operable to radially enlarge a region of the tube for the tube to fold at the enlarged region, the support linkage being in the locked condition when the tube is in the tubular condition and being in the unlocked condition when the tube is folded.

* * * * *